H. BRETSCHER.
PNEUMATIC TIRE FOR VEHICLES.
APPLICATION FILED SEPT. 7, 1918.
1,307,036.
Patented June 17, 1919.
2 SHEETS—SHEET 1.
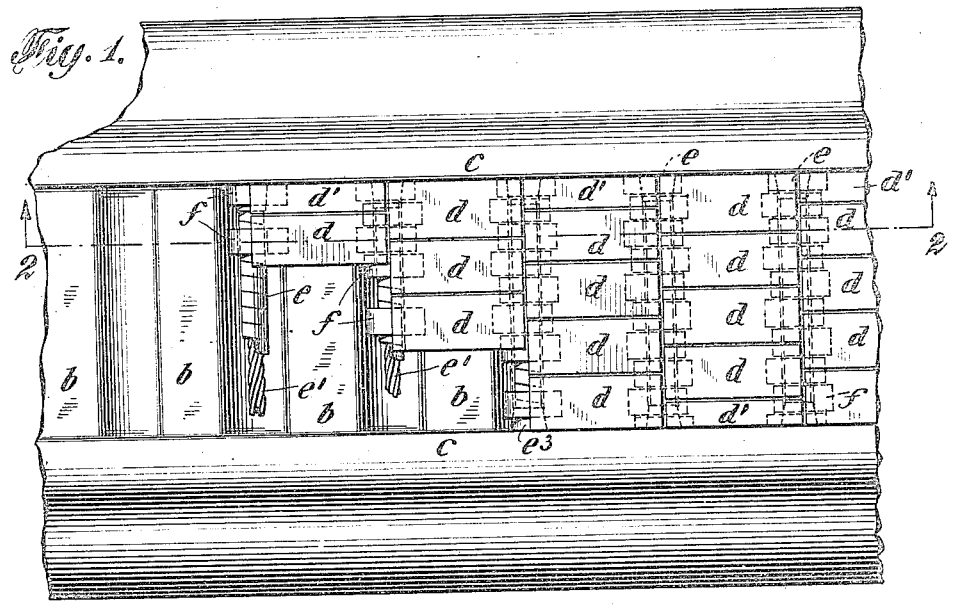
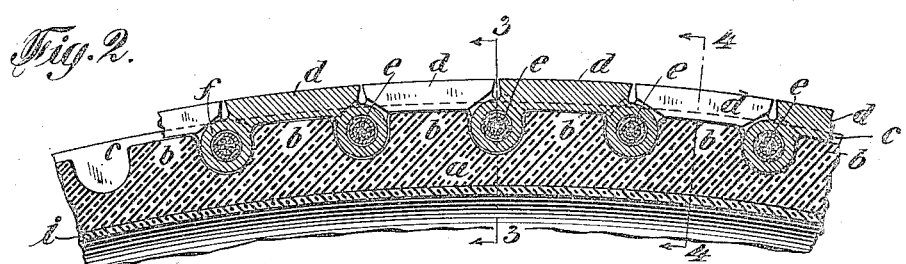
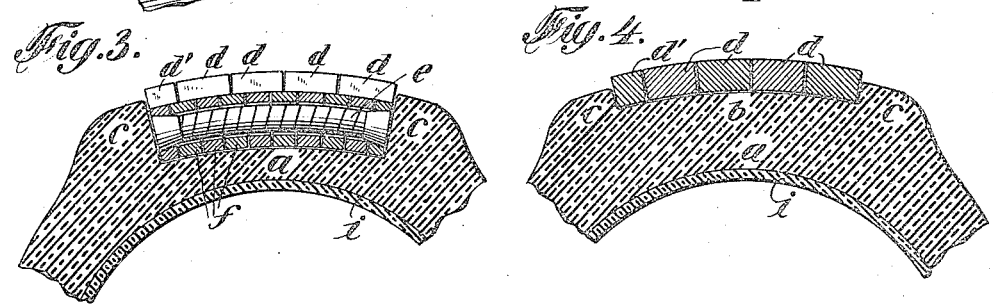
Witnesses:
Fred Roeger.
Minnie Maloney.
Hans Bretscher, Inventor
By Henry Schreiter his Attorney

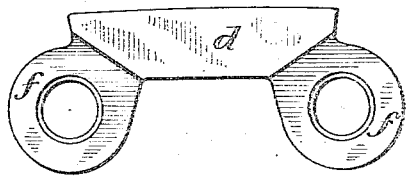
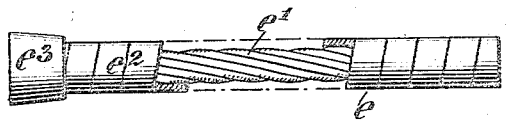
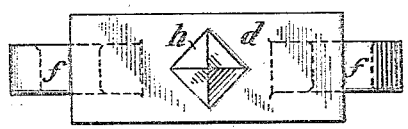
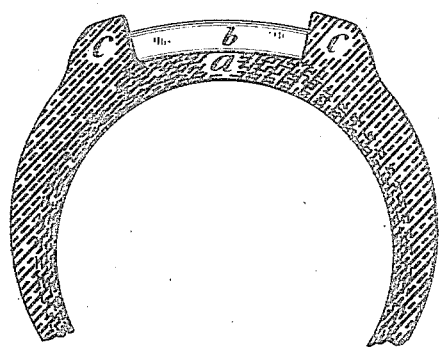
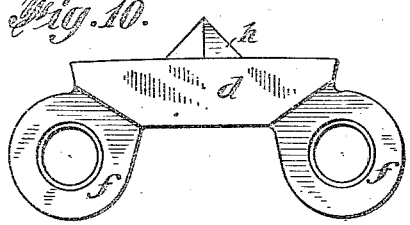
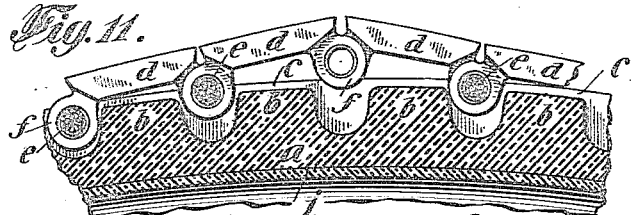

UNITED STATES PATENT OFFICE.

HANS BRETSCHER, OF NEW YORK, N. Y., ASSIGNOR OF THIRTY-FIVE ONE-HUNDREDTHS TO FELIX SPITZNER, OF NEW YORK, N. Y.

PNEUMATIC TIRE FOR VEHICLES.

1,307,036.     Specification of Letters Patent.     Patented June 17, 1919.

Application filed September 7, 1918. Serial No. 253,093.

*To all whom it may concern:*

Be it known that I, HANS BRETSCHER, a citizen of Switzerland, and a resident of the borough of Manhattan, city, county, and State of New York, have invented certain new and useful Improvements in Pneumatic Tires for Vehicles, of which the following is a full, clear, and exact specification.

Figure 1 is a plan view of a part of a pneumatic tire constructed according to my invention; part of the chain tread being omitted to disclose the formation of the casing underneath;

Fig. 2 is a fractional longitudinal sectional view thereof on line 2—2, indicated in Fig. 1;

Figs. 3 and 4 are cross-sectional views thereof, Fig. 3 on lines 3—3 and 4—4, indicated in Fig. 2;

Figs. 5 to 10 are enlarged details; Fig. 5 is a plan view; Fig. 6 a side elevation of one of the central links, and Fig. 7 a plan view of one of the edge links, in the chain tread of the tire; Fig. 8 is an elevation of one of the bolts or pintles, transversely connecting together the rows of the links of the chain tread of the tire;

Fig. 9 is a plan view, and Fig. 10 a side elevation of a modified form of the links, of which the chain tread of the tire is composed;

Fig. 11 is a fractional side elevation showing the position of the ends of the chain tread on the tire casing, preparatory to connecting them;

Fig. 12 is a cross-sectional view showing the parts of the tire casing engaging with the chain tread.

The object of my invention is to devise a commercially practicable construction of pneumatic tire casings for vehicles not liable to injury by perforation, affording safety in travel on slippery roads, and capable of enduring hard wear and long usage, without materially increasing its costs of production and weight.

The body $a$ of the casing of my improved pneumatic tire is formed of any suitable material, preferably of canvas duck and rubber, combined in the form shown in Fig. 12, the transverse ribs $b$ and the annular flanges $c$ being molded thereon in the same way as other conformations of the tread part of a tire casing are molded. The chain tread to be laid into the space between the flanges $c$ of the body of the tire is composed of links $d$ and $d'$ made preferably of malleable iron and arranged in rows, and the links in each row connected together and to the links of the adjoining row by the flexible and, to some extent, longitudinally extensible bolts $e$. The links are made in two forms. The form of the links $d'$ illustrated in Fig. 7, differs from that of the links $d$, shown in Figs. 5 and 6, only in their being narrower, and in that their lugs $f$ are not located centrally to their width, being set flush with one longitudinal side of the links. The purpose of so forming the links $d'$ is shown in Fig. 1 illustrating a plan view of the tire. Links $d'$ are used on the alternating ends of the transverse rows to make even the edges of the chain tread of the tire. Each of the links $d$ and $d'$ has two lugs $f$, one on each end, formed integrally with its body. The lugs extend underneath, and beyond the ends of, the body of the link, and are perforated to admit the aforementioned flexible bolts $e$, shown in Fig. 8, to be passed through the lugs of the adjoining rows of the links, whereby they are transversely connected when the chain tread is being assembled.

The surfaces of the links $d$ and $d'$ may be flat and smooth or rough, (variously ribbed) or pointed projections may be made thereon as, for instance, illustrated in Figs. 9 and 10, showing the projections $h$ somewhat exaggerated. The object of the ribs or projections is to give the tires a firmer grip on slippery pavements, or when the vehicle is driven over ice. The form of links $d$ and $d'$, shown in Figs. 5, 6 and 7, with flat surfaces, has demonstrated in practical use its sufficiency to prevent sidewise skidding on wet asphalt pavements, or on ice.

The flexible bolts $e$ (see Fig. 8) are made of twisted wire cable $e'$ as a core, and a flat strip $e^2$ of drawn steel, tightly wound thereon. They are cut in suitable lengths and a conically shaped head $e^3$ is brazed on one end thereof when the bolts are made. A similarly shaped head is brazed on the other end of each bolt when the chain is assembled as each bolt is set in place.

The chain tread is formed separately from the tire casing, and is made of the requisite width and length, corresponding to the different sizes of the tires, and is then set in its place between the side flanges c of the casing. In doing this, the ends of the chain tread are gripped by the jaws of tool designed for this work, and drawn together on the tire casing, until the perforations in the lugs of the two terminal rows of the links register. By the aforementioned tool the two terminal rows of the links are also drawn above the side flanges c of the tire casing, approximately into the position shown in Fig. 11. Then a flexible bolt e is passed through the registering perforations of the lugs, and a head is brazed on its end, drawn through the links. Then the grip of the tool upon the thus connected terminal rows of the links is released. This completes the making of the tire casing. The connected rows of the lugs f are then seated in the depressions between the transverse ribs b, b, etc., and the rows of the bodies of the links d and d' saddle the said ribs. The chain tread fits the tire casing quite snugly, the ribs b, b, etc., and the intervening depressions, being formed correspondingly to the contour of the links and lugs respectively, as shown in Fig. 2. When the tube i is inserted in the casing, and the tire inflated, the chain tread becomes rigidly embedded therein, curving and conforming to the contour of the tire, circumferentially and transversely. The annular flanges c hold the chain tread laterally in position, and creeping of the chain tread on the tire casing is most effectively prevented, not alone by the engagement of the lugs f in the depressions, and by the saddling grip of the links upon the ribs b, b, etc., but also by the very snug fitting of the chain tread upon the casing.

The chain tread being the only part coming in contact with the surface of the road, the possibility of perforation, or of tearing the tire is absolutely excluded, and the wear by abrasion reduced to an almost negligible minimum. The greatest advantage, however, obtained by the use of a pneumatic tire constructed according to my invention is the safe and secure grip on the road, and the security it provides against skidding on slippery pavements in all kinds of weather and conditions.

I claim as my invention:

1. A pneumatic tire for vehicle wheels, comprising an inflatable tube, a casing of flexible material having an annular recess along the apex of its periphery with transverse ribs formed in the bottom of the recess, and a chain composed of rows of flexibly connected metallic links having lugs, extending underneath and beyond their ends, and shaped to engage the transverse ribs in the recess, applied in the recess of the casing; substantially as herein shown and described.

2. A pneumatic tire for vehicle wheels, comprising an inflatable tube, a casing of flexible material having an annular recess along the apex of its periphery with transverse ribs formed in the bottom of the recess, and a chain of metallic links, shaped to engage the transverse ribs in the bottom of the recess and connected to form a tread, arched to conform to the contour of the tire and forming a substantially solid surface, applied in the recess of the casing; substantially as herein shown and described.

3. A chain tread for pneumatic tires, composed of rows of metallic links, having a substantially rectangular body and perforated lugs, extending underneath and beyond the ends of the body of the links, and of flexible bolts, passing through the perforations of the lugs, thereby connecting the links of each row together and to the links of the adjoining row; substantially as herein shown and described.

4. A bolt for flexibly connecting together the links of a chain tread for pneumatic tires; the bolt comprising a core of wire cable, a strip of drawn metal wound thereon, and a head brazed on one end, the other end being adapted to have a head secured thereto; substantially as herein shown and described.

HANS BRETSCHER.

Witnesses:
CHARLES S. SKINNER,
MINNIE MALONEY.